United States Patent [11] 3,611,816

[72] Inventors Gerhard Wedekind
    Hannover-Linden;
    Karl Schulz, Hannover, both of Germany
[21] Appl. No. 829,170
[22] Filed June 2, 1969
[45] Patented Oct. 12, 1971
[73] Assignee Continental Gummi-Werke Aktiengesellschaft
    Hannover, Germany

[54] SLEEVE FOR SEALING COAXIALLY ARRANGED PARTS
    6 Claims, 6 Drawing Figs.
[52] U.S. Cl. ............................................. 74/18.2,
    64/32 F
[51] Int. Cl. ............................................. F16j 15/52
[50] Field of Search ........................... 74/18, 18.1,
    18.2; 64/32 F, 21

[56] References Cited
    UNITED STATES PATENTS
2,510,362  6/1950  Anderson .............. 74/18.1 X

| 2,579,356 | 12/1951 | Anderson ............. | 64/21 |
| 2,896,987 | 7/1959 | Meyer ................ | 74/18.2 |
| 3,162,024 | 12/1964 | Brever et al. ........ | 64/21 X |
| 3,176,476 | 4/1965 | Cull ................. | 64/21 X |
| 3,378,286 | 4/1968 | Gottschald .......... | 74/18 X |

FOREIGN PATENTS
1,347,808  11/1963  France ..................  64/32 F

Primary Examiner—William F. O'Dea
Assistant Examiner—F. D. Shoemaker
Attorney—Walter Becker ABSTRACT: A sleeve of rubber material for covering up coaxially arranged members, especially shafts and housings, movable relative to each other in at least one of the following directions: axial direction, eccentric direction; and angular direction; said sleeve including a hollow conical body having marginal sections with bead means and an intermediate section interconnecting said marginal sections and gradually decreasing in diameter from the marginal section of smaller diameter to the marginal section of larger diameter of said conical body.

PATENTED OCT 12 1971 3,611,816

INVENTOR
Gerhard Wedekind
BY
Walter Becker

SLEEVE FOR SEALING COAXIALLY ARRANGED PARTS

The present invention relates to a closing sleeve of rubber material for the sealing of coaxially arranged parts, especially rotatable parts, such as shafts and their housings, which move axially, eccentrically or angularly with regard to each other.

The corrugated and folds containing sleeves heretofore known for the purpose involved require considerable installation space which is not always available. Furthermore, sleeves of this type are subject to an easy wear and tear when the central sections are not radially guided.

It is, therefore, an object of the present invention to provide a closing sleeve which will overcome the above-mentioned drawbacks.

It is a further object of this invention to provide a closing sleeve which has a short axial extension and which at the same time permits large angular deflections and axial displacements as well as eccentric offsetting movements of the parts with regard to each other.

These and other objects and advantages of the invention will appear more clearly from the following specification in connection with the accompanying drawing, in which.

Figure 1:
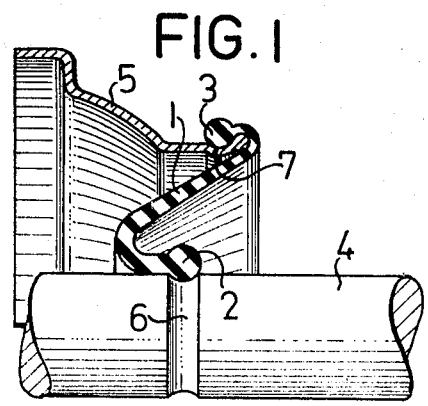
FIG. 1 is an axial section through an installed sleeve according to the invention.

The objects outlined above have been realized according to the present invention by designing the sleeve in the shape of a hollow cone provided with reinforced ends or beads while the wall of said hollow cone decreases in thickness from the smaller diameter of said cone to the larger diameter thereof so that the resistance moment of the bent sleeve in installed position will be substantially the same at all diameters of the sleeve. In view of the fact that the walls decrease in thickness from the smaller diameter to the larger diameter, it will be appreciated that with all axial movements of the shafts equipped with the sleeve according to the present invention relative to the housings and also with angular deflections of these parts relative to each other, rolling bellowslike movements will be produced in the sleeve wall and, more specifically, with a rolling radius remaining constant, so that the stresses in all parts of the sleeve will in conformity with the requirements be substantially uniform. The sleeve design in this way will in spite of its short structure be able to absorb the various relative movements while being resistant to the respective stresses so that the sleeve will have a considerably long life span.

Advantageously, the sleeves according to the invention are so designed that the annular reinforced ends of the adjacent portions of the wall define a hollow cylinder when installed and the central wall portions define a cone in installed condition. Due to the merging of the hollow cylindrical portions with the hollow conical sections in installed condition of the sleeve, said hollow conical sections are able during the rolling movement additionally to yield so that a further relaxing of the tension will occur at those sections which are stressed to the greatest extent.

According to a further development of the present invention, the hollow conical exposed wall sections are so designed that the extensions of the wall pass approximately through the swivel point of the shaft because with such a design slight deformations in the material will occur in response to tilting movements.

According to another suggestion within the framework of the invention, the sleeves are advantageously so designed that the bend of the wall from the hollow cylindrical sections to the conical sections amounts to more than 90° so the axial section of the sleeve is of z-shape. With this arrangement, a particularly short overall length is obtained because the two hollow cylindrical sections of the sleeve which are intended for connection of the sleeve are in axial direction located at approximately the same level.

According to still another development of the invention, the wall is so designed that in noninstalled condition it forms a hollow cone. When the sleeve is installed, the two ends are folded over and, more specifically, the smaller annular reinforcement is folded inwardly while the larger annular reinforcement or bead is folded outwardly. For holding the sleeves, the predominantly annular reinforcements engage correspondingly designed annular grooves of the metal parts to which the sleeve is connected under preload.

In order to assure that the wall adjacent the larger annular reinforcement will during the folding be subjected only to slight stresses, it is possible, in conformity with a further feature of the invention, so to design the sleeve that the wall in noninstalled condition has a hollow cylindrical portion with a bend in excess of 90°. When installing the sleeve and connecting the same with the metal parts, the wall section will in the vicinity of the larger annular reinforcement already have the necessary shape.

According to a further improvement of the sleeve according to the present invention, the sleeve is in noninstalled condition in the vicinity of the larger and smaller annular reinforcements designed as a hollow cylinder with a bend smaller than 90°. This makes the sleeve particularly suitable for connection at both ends to cylindrical surfaces.

Finally, in order to obtain a rolling movement as uniform as possible in the wall portions of the sleeve, it is suggested according to the invention that the annular reinforcement and the adjacent wall section in the rest position of the sleeve have a hollow cylindrical shape and the intermediate exposed wall portions have a shape which, when viewed in axial section, follows an outwardly open involute. The merging areas into cylindrical sections of the wall will then be so designed that folds or bends cannot occur in these areas.

Figure 2:
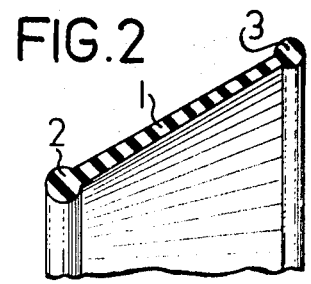
FIG. 2 shows a sleeve according to FIG. 1 in noninstalled condition.

Referring now to the drawing in detail, the sleeve, as will be evident from FIG. 2, has a wall 1 which decreases in thickness from the inner or smaller diameter end of the sleeve to the outer or larger diameter end while the ends of the sleeve are reinforced by annular thickened portions or beads 2 and 3. These annular beads 2, 3 are in the particular embodiment shown in FIG. 2 of a circular cross section so that they can be inserted into annular or curved slots 6, 7 of a shaft 4 and a housing 5 under a preload. The wall portions directly adjacent said annular beads 2 and 3 are folded inwardly and outwardly respectively so that the sleeve in installed condition has a Z-shaped cross section. The annular bead 2 engages the groove 6 of shaft 4 whereas the annular bead 3 engages the groove 7 of the housing portion 5 which rotates together with the shaft.

Figure 3:
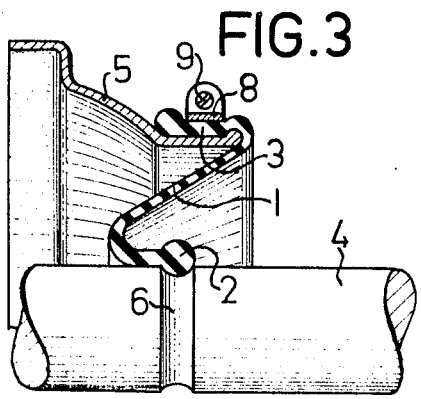
FIGS. 3 and 4 illustrate a modified sleeve according to the invention in installed and noninstalled condition respectively.
Figure 4:
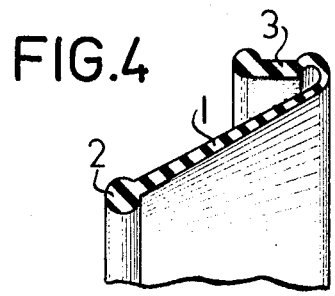

According to the embodiments of FIGS. 3 and 4, the outer annular bead 3 forms together with the adjacent wall a hollow cylinder already in its rest position so that when assembling the bead 3, the material of the wall 1 in the immediate vicinity of the bead 3 does not have to be stretched. For connecting the bead 3 to the housing 5, there is provided a clamp 8 which is fastened or clamped by a screw 9. The annular bead 2 is also in this embodiment engaging the groove 6 of the shaft 4.

Figure 5:
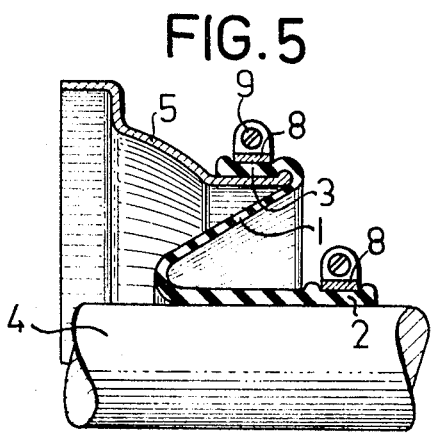
FIG. 5 shows an assembled sleeve in its rest position.

The sleeve shown in FIG. 5 is adjacent the bead 2 and also adjacent the bead 3 provided with hollow cylindrical wall portions which through a bend in excess of 90° merge with the hollow conical portion of the wall 1 so that together these parts form a Z-shaped sleeve which has its wall 1 decreasing with increasing diameter. According to this embodiment, the bead 2 is likewise fastened by means of a clamp 8.

Figure 6:
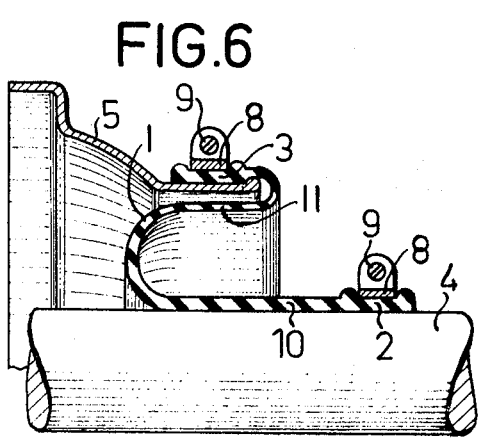
FIG. 6 illustrates an axial section of the sleeve with a round wall section.

The sleeve shown in FIG. 6 is similar to the sleeve of FIG. 5 Z-shaped in cross section. However, in distinction from FIG. 5, the curvature of the wall 1 decreases from the inside toward the outside in conformity with an involute so that a harmonic transition into the hollow cylindrical wall portions 10 and 11 is effected. In this way, noncontrollable depressions during the axial and angular movements of the shaft 4 will be avoided.

With all embodiments set forth above, a rolling movement of the wall 1 will occur as soon as an axial displacement of the shaft 4 is effected or when the shaft 4 occupies an angular position with regard to the housing 5. The resistance of the material of wall 1 against bending remains constant regardless of whether the rolling movement occurs in the outer or inner section of the wall 1.

It is, of course, to be understood that the present invention is, by no means, limited to the structures shown in the drawing but comprises modifications within the scope of the appended claims.

What we claim is:

1. A sleeve of rubber material for covering up coaxially arranged members, especially shafts and housings, movable relative to each other in at least one of the following directions: axial direction, eccentric direction, and angular direction; said sleeve including in combination a hollow conical body having marginal sections with bead means and an intermediate section interconnecting said marginal sections and gradually decreasing in thickness along diameter progressively from the marginal section of the smaller diameter to the marginal section of the larger diameter of said conical body, said marginal sections respectively being inverted to form hollow cylindrical bodies of different diameters.

2. A sleeve in combination according to claim 1, in which the angle described by said intermediate section with said marginal sections is in excess of 90° so that the cross section of the wall of said sleeve body turned inside out is Z-shaped.

3. A sleeve of rubber material for covering up coaxially arranged members, especially shafts and housings, movable relative to each other in at least one of the following directions: axial direction, eccentric direction, and angular direction: said sleeve including in combination a hollow conical body having marginal sections with bead means and an intermediate section interconnecting said marginal sections and gradually decreasing in thickness along diameter progressively from the marginal section of smaller diameter to the marginal section of larger diameter of said conical body, the intermediate section of said sleeve tapering from and including one marginal section to and including the other marginal section forming a hollow cone.

4. A sleeve of rubber material for covering up coaxially arranged members, especially shafts and housings, movable relative to each other in at least one of the following directions: axial direction, eccentric direction, and angular direction; said sleeve including in combination a hollow conical body having marginal sections with bead means and an intermediate section interconnecting said marginal sections and gradually decreasing in thickness along diameter progressively from the marginal section of smaller diameter to the marginal section of larger diameter of said conical body, that marginal section which includes the larger diameter of said conical body being folded toward the outside of said conical body by an angle in excess of 90°.

5. In combination with a shaft and a housing surrounding said shaft in spaced relationship thereto, a sleeve of rubber material having a conical hollow body of progressively differing wall thickness with marginal bead means, said bead means respectively engaging said shaft and said housing, and in which the conical sleeve wall section together with said marginal sections including said bead means define a Z-shaped cross-sectional contour.

6. An arrangement in combination according to claim 5, in which said conical sleeve wall section defines with the axes of said housing and said shaft in version with an angle in excess of 90°.